Patented Mar. 4, 1952

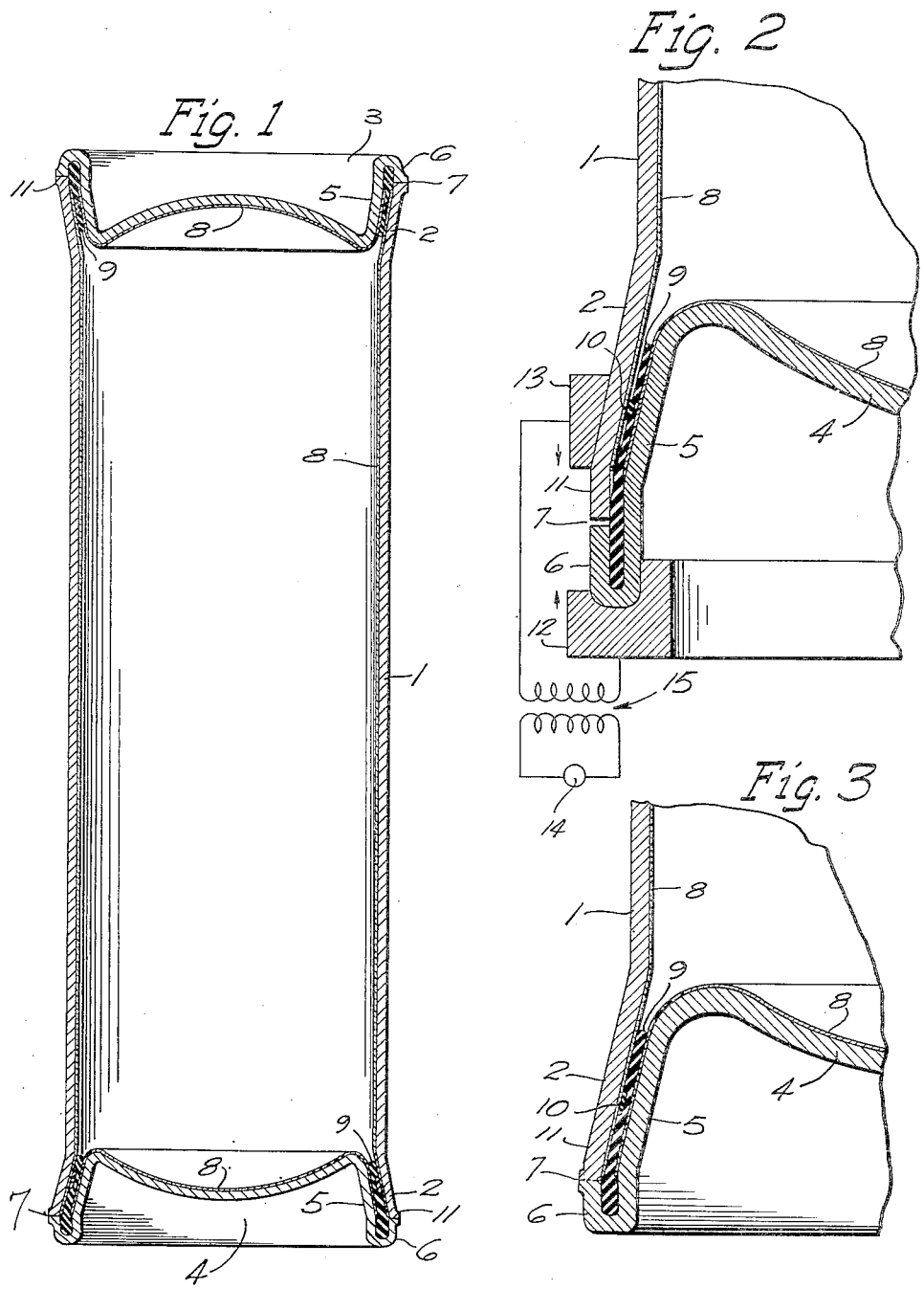

2,587,840

UNITED STATES PATENT OFFICE 2,587,840

WELDED ARTICLE AND METHOD OF MAKING THE SAME

Frederick A. Gruetjen, Milwaukee, Wis., assignor to A. O. Smith Corporation, Milwaukee, Wis., a corporation of New York Application September 12, 1945, Serial No. 615,734

6 Claims. (Cl. 220—67)

This invention relates to a welded article and method of making the same and has particular reference to an article that is formed of two circular members with parts of generally conical shape and butt welded together by flash welding or the like.

The invention is illustrated in the drawings and described herein as applied to the construction of a hot water tank provided with a corrosion-protecting lining of ceramic enamel or the like and in which it is necessary to effectively seal the joint areas between the heads and shell.

One of the objects of the invention is to provide a flash welded joint which is automatically sealed against fluid contact therewith on one side as in the case of a welded tank or the like.

Another object of the invention is to provide an electric flash welded tank of rolled and pressed metal stock and in which inside flash is avoided and the weld is protected from corrosion.

Another object is to provide an electric butt weld between two overlapping concentric circular members of rolled plate stock.

Another object is to provide a method of electric flash welding two overlapping concentric circular members of pressed metal stock together.

Another object is to provide a method of sealing a circumferential butt weld in a tank against corrosion from fluid in the tank.

Another object is to provide a hot water tank or the like of electric butt welded construction.

A further object is to provide a method of flash welding a head to the shell of a tank under which flash is prevented from entering inside the tank or lodging between the head and shell.

Another object is to provide a method of flash welding the head to the shell of a tank without injury to the lining of the tank.

A further object is to provide a butt welded hot water tank in which the approach to the weld is effectively sealed by insulating material in the flash welding operation.

Other objects of the invention will be clear from the following description and accompanying drawing illustrating the invention.

In the drawing:

Figure 1 is a longitudinal sectional view of a tank constructed in accordance with the invention;

Fig. 2 is an enlarged section through the assembled head and shell just prior to welding; and Fig. 3 is a similar section through one of the welded joints of Figure 1 and showing the completed weld after trimming of the outside flash.

The sheet metal hot water tank with which the invention is illustrated comprises a cylindrical shell 1 having flared or conical end portions 2 and end heads 3 and 4 each of which has a peripheral flange 5 that is of conical shape and flares in the same manner as the corresponding flared end 2 of shell 1. Each head is provided with a reverse bend 6 providing a cylindrical portion at the edge thereof and is electric flash or resistance butt-welded to a corresponding cylindrical edge portion of end edge 2 of the shell 1 as at 7.

The shell and heads are provided with a ceramic enamel lining 8 or other protective lining and the linings thereof overlap at the respective ends of the tank between the flared portions 2 and corresponding flanges 5.

A suitable gasket 9 of asbestos or the like is glued to the shell 1 or otherwise secured between the linings 8 of the overlapping areas of the head and shell when these parts are assembled together. The gasket 9 during the flash welding operation prevents flash from entering the inside of the tank and also directs the welding current through the reverse bend 6 rather than across the space between the weld area and the body portion of the flange 5 of the head. In addition the gasket 9 serves to seal the joint between the linings 8 of the head and shell in the approach to the weld. A soft gasket 10 of rubber or the like may be secured to gasket 9 midway of the flare of the head as a positive stop to flow of confined fluid to the joint.

The extreme end 11 of the flared end portion 2 of the shell is cylindrical and is axially aligned with the cylindrical end of the reverse bend 6 of the flange 5 of the head so that these parts may be readily flashed welded together with relative axial movement of the parts during welding.

Both the heads 3 and 4 are assembled and welded to the shell 1 in the same manner. The assembly and welding of head 4 is shown and is described hereinafter.

After lining the shell 1 and head 4 with ceramic enamel as described, the insulating gasket 9 is glued or clamped around the flange 5 of the head 4 and in final position extends into and substantially fills the crevice within the reverse bend 6. The gasket 10 is next secured in place as described.

In carrying out the welding operation the head 4 is disposed in a welding machine wherein the reverse bend 6 of the head is mounted within the electrode 12. The shell 1 is also assembled within the welding machine and the flared end portion 2 with the cylindrical extreme end 11 is mounted within the electrode 13. In this position the end 11 of the shell 1 is directly in alignment with the inwardly turned and cylindrical end of the reverse bend 6 of head 4.

The welding electrodes 12 and 13 are connected to a source 14 of electrical power through the transformer 15. Pressure is applied on the electrodes in any suitable manner such as mechanically or hydraulically, not shown, to move them toward each other. Arrows in the drawing indicate the movement of the welding electrodes toward each other to weld the head 4 to the shell 1 as at 7. The electrodes are moved at a predetermined controlled rate to maintain the flashing arc between the opposed edges until the edges are sufficiently heated and then the edges are butted under pressure and the welding current discontinued to complete the weld.

In the welding operation the clearance between the conical sections of the head and shell, as illustrated in Fig. 2, is taken up and the conical end portion 2 of the shell and tapered flange 5 of the head move toward each other into tight fitting confinement of the gasket 9 therebetween as the metal of the members at line 7 is upset outwardly or flashed away.

As the shell and head move together during welding, the insulating gasket 9 is tightly compressed therebetween to seal off the joint and to effect outward upset of the metal at line 7 and prevent any of the flash from entering the inside of the tank. The gasket 10 is also compressed and confined between the head and shell as these parts move together to act as a positive stop for internal fluid from reaching the joint area.

The gasket 9 also eliminates any bridging or shorting of the welding current during welding by preventing the current from jumping from end edge 11 to the peripheral flange 5 of the head as would be the tendency if the gasket were not provided to insulate the joint.

The length of the outer cylindrical portion of reverse bend 6 should be less than that of the inner cylindrical portion so that the weld flashing will be adjacent to a cylindrical portion of gasket 9 at all times.

The invention provides a flash welded joint which is effectively sealed by an insulating gasket as the parts move together in the welding operation. The invention also is effective in providing an electric flash weld in sheet metal parts and particularly in the welding of circumferential seams as for tank closures.

Various embodiments of the invention may be employed within the scope of the accompanying claim.

I claim:

1. An electric flash welded article, comprising a pair of sheet metal members having at least a portion thereof adjacent the welded seam extending in parallel overlapping relation, one of said members having its edge formed in a reverse bend and extending toward the other member to provide a substantially cylindrical edge portion facing a corresponding edge portion of the end edge of the other member, an electric flash butt weld between the edges of said members, and an insulating gasket disposed between the overlapping portions of said members and extending past the welded edges and into said reverse bend, said gasket being compressed between said overlapping portions by the movement of the members toward each other during welding.

2. An electric flash welded article, comprising a substantially cylindrical wall having an outwardly flared end, a closure for the end of said wall having an outwardly flared flange disposed inside the outwardly flared end of said wall and substantially parallel thereto, the outer edge of said flange having a reverse bend therein to provide a substantially cylindrical edge portion facing a corresponding edge portion of the end edge of said wall, an electric flash butt weld between said edges, and a compressible insulating gasket disposed between said flared sections and extending past the weld into said reverse bend, said gasket being compressed between the flared sections by the movement of said sections toward each other during the welding operation.

3. An electric flash welded tank, comprising a cylindrical body having its wall flared outwardly at one end in a generally frusto-conical shape, a closure for said body set into said flared end and having a circumferential outwardly flared flange complemental to and wedged within said outwardly flared end of the body, the outer edge of said flange having a reverse bend therein to provide a substantially cylindrical edge portion facing a corresponding edge portion of the end edge of said body, an electric flash butt weld between said edges for the full circumference of the tank, and a compressible insulating gasket ring disposed in said reverse bend and extending past the weld into the region of said flared sections whereby said gasket is compressed between said flared sections during wedging of the latter by axial movement of the closure into the end of said body in the flash welding operation and said gasket substantially prevents inward upset of the edges in welding.

4. The method of constructing an electric flash butt welded sheet metal joint with the approach to the joint sealed at one side against circulation of fluid thereto, comprising forming the sheet metal members to be welded with complementary overlapping portions disposed at an angle to the edge portions and adjacent thereto, constructing a reverse bend in one edge portion providing an edge facing and complemental to the opposite edge portion to be welded thereto, said reverse bend edge portion extending toward the opposite edge portion from the side of said reverse bend member, inserting an insulating gasket between the overlapping portions of said members and extending into said reverse bend, applying a welding current to the opposite members and moving the members toward each other to establish an electric flashing between the opposed edges with the insulation in place between the members, and finally completing the weld by forcing the opposed edges together with the gasket confined between said overlapping portions of the members to seal the approach to the weld.

5. The method of closing the end of a sheet metal cylindrical member, comprising flaring a portion thereof adjacent the end outwardly in a generally frusto-conical shape, forming a sheet metal end head with an outwardly flared flange corresponding to the flare of said cylinder end and adapted to be inserted therein to provide overlapping frusto-conical portions, forming a reverse bend on the outer edge of said flange to provide a generally cylindrical edge portion corresponding in diameter to a similar edge portion on said cylinder end, assembling said head in said cylinder with an insulating gasket ring between said overlapping portions and extending into said reverse bend, applying a welding current to the cylinder and head and moving the same relatively axially toward each other to establish an electric flashing between the opposed edges with the insulation between the weld area and said head flange to prevent undesirable current flow shunting the weld area, and finally completing the weld by forcing the opposed edges together axially of the cylinder with the weld upset forced to the outside by the insulation.

6. The method of constructing an electric flash welded tank, comprising constructing a cylindrical sheet metal tank body with a portion adjacent the end flared outwardly to a generally frusto-conical shape and with the end edge portion substantially cylindrical, constructing an end head of sheet metal with an outwardly flared flange corresponding to the flared portion of said cylinder and adapted to be inserted into the cylinder end with the flange wedged against the flared portion of the cylinder, forming a reverse bend on the outer edge of said flange to provide a cylindrical edge portion directed toward the cylindrical edge portion of said cylinder and of the same diameter, assembling the cylinder and head in an electric flash welding machine with insulating material disposed in said reverse bend and extending into the space between the flared members and with a gasket ring disposed between the flared portion of the cylinder and the flared flange of the head, applying a welding current to the opposite edge portions of the cylinder and head and relatively moving the same axially toward each other to establish an electric flashing between the edges with the insulation between the weld area and said head flange preventing current leakage from the weld area, and finally completing the weld by forcing the opposed edges together under substantial pressure, said final welding step serving to compress the gasket ring between the flared members to seal the same against circulation of the fluid contents of the tank against the weld.

FREDERICK A. GRUETJEN.

REFERENCES CITED

The following references are of record in the file of this patent:

UNITED STATES PATENTS

| Number | Name | Date |
| --- | --- | --- |
| 1,718,322 | Walker | June 25, 1929 |
| 1,828,340 | Reed | Oct. 20, 1931 |
| 2,239,509 | Uecker | Apr. 22, 1941 |
| 2,263,021 | Uecker | Nov. 18, 1941 |